(12) United States Patent
Bornegård

(10) Patent No.: US 12,330,227 B2
(45) Date of Patent: Jun. 17, 2025

(54) METHOD AND A SYSTEM FOR BRAZING A PLATE HEAT EXCHANGER

(71) Applicant: SWEP INTERNATIONAL AB, Landskrona (SE)

(72) Inventor: Niclas Bornegård, Bjärred (SE)

(73) Assignee: SWEP INTERNATIONAL AB, Landskrona (SE)

( * ) Notice: Subject to any disclaimer, the term of this patent is extended or adjusted under 35 U.S.C. 154(b) by 211 days.

(21) Appl. No.: 18/015,851

(22) PCT Filed: Jul. 2, 2021

(86) PCT No.: PCT/SE2021/050665
§ 371 (c)(1),
(2) Date: Jan. 12, 2023

(87) PCT Pub. No.: WO2022/015216
PCT Pub. Date: Jan. 20, 2022

(65) Prior Publication Data
US 2023/0256530 A1 Aug. 17, 2023

(30) Foreign Application Priority Data
Jul. 13, 2020 (SE) .................................... 2050886-7

(51) Int. Cl.
*B23K 1/00* (2006.01)
*B23K 1/008* (2006.01)
(Continued)

(52) U.S. Cl.
CPC ............ *B23K 1/0012* (2013.01); *B23K 1/008* (2013.01); *B23K 1/012* (2013.01); *B23K 3/085* (2013.01);
(Continued)

(58) Field of Classification Search
CPC .. B23K 1/0012; B23K 1/008; B23K 2101/14; B23K 37/003; B23K 37/00; F28F 2275/04; F28F 9/18; F28F 9/268
See application file for complete search history.

(56) References Cited

U.S. PATENT DOCUMENTS 3,375,570 A * 4/1968 Dubusker ............ B23K 1/0012
228/183
4,231,508 A * 11/1980 Wagner .................. B23K 1/008
228/183
(Continued)

FOREIGN PATENT DOCUMENTS

| KR | 102064200 B1 | 1/2020 |
| WO | 2014156846 A1 | 10/2014 |

OTHER PUBLICATIONS

PCT International Search Report for PCT Application No. PCT/SE2021/050665 mailed on Oct. 25, 2021 (3 pages).
(Continued)

*Primary Examiner* — Erin B Saad
(74) *Attorney, Agent, or Firm* — Merchant & Gould P.C.

(57) ABSTRACT

A method for brazing a plate heat exchanger (10) having a stack of heat exchanger plates with depressions and elevations forming interplate flow channels and port openings being in selective fluid communication with said interplate flow channels, the method comprising the steps of placing the stack of heat exchanger plates in a heating chamber (16) of a furnace (15), conducting a gas for changing the temperature of the stack of heat exchanger plates through a plurality of nozzles (23) inside the heating chamber (16), and conducting gas from at least one of said nozzles (23) into at least one of the port openings (O1-O4) of the stack of heat exchanger plates. Disclosed is also a system for brazing a plate heat exchanger (10).

8 Claims, 7 Drawing Sheets

(51) Int. Cl.
*B23K 1/012* (2006.01)
*B23K 3/08* (2006.01)
*F28D 9/00* (2006.01)
*F28F 3/08* (2006.01)
*B23K 101/14* (2006.01)

(52) U.S. Cl.
CPC .............. *F28D 9/0062* (2013.01); *F28F 3/08* (2013.01); *B23K 2101/14* (2018.08); *F28F 2275/045* (2013.01)

(56) References Cited

U.S. PATENT DOCUMENTS

| | | | | |
|---|---|---|---|---|
| 4,412,453 | A * | 11/1983 | Nagai | G01N 29/265 73/601 |
| 4,580,716 | A * | 4/1986 | Barresi | B23K 35/386 228/180.1 |
| 4,877,083 | A * | 10/1989 | Saperstein | B23K 1/0012 165/DIG. 482 |
| 5,322,209 | A * | 6/1994 | Barten | B23K 1/0012 228/183 |
| 8,347,877 | B2 * | 1/2013 | Shabtay | F24S 80/70 126/669 |
| 11,059,092 | B2 * | 7/2021 | Sjödin | B23K 35/24 |
| 11,105,560 | B2 * | 8/2021 | Masgrau | F28D 9/0056 |
| 12,103,115 | B2 * | 10/2024 | Masuda | C22C 21/02 |
| 2001/0030043 | A1 * | 10/2001 | Gleisle | F28D 9/005 165/167 |
| 2001/0047861 | A1 * | 12/2001 | Maeda | B23K 1/0012 228/262.42 |
| 2005/0155749 | A1 * | 7/2005 | Memory | F28D 9/005 165/167 |
| 2006/0185168 | A1 * | 8/2006 | Morita | C23C 4/18 420/528 |
| 2010/0006275 | A1 * | 1/2010 | Arvidsson | F28D 9/005 165/170 |
| 2015/0285572 | A1 * | 10/2015 | Fleitling | F28D 9/0006 165/167 |
| 2016/0131433 | A1 * | 5/2016 | Hartfield | F28D 9/0093 165/166 |
| 2017/0176047 | A1 * | 6/2017 | Kondo | B23P 15/26 |
| 2017/0241716 | A1 * | 8/2017 | Schatz-Knecht | F28D 9/0043 |
| 2019/0217409 | A1 * | 7/2019 | Kirkham | B23P 15/26 |
| 2021/0187672 | A1 * | 6/2021 | Nomura | B23K 35/3601 |
| 2022/0397350 | A1 * | 12/2022 | Ji | B23K 1/19 |
| 2024/0133634 | A1 * | 4/2024 | Dahlberg | F28F 9/0268 |

OTHER PUBLICATIONS

Written Opinion of the International Searching Authority for PCT/SE2021/050665 mailed on Oct. 25, 2021 (6 pages).

* cited by examiner

METHOD AND A SYSTEM FOR BRAZING A PLATE HEAT EXCHANGER

This application is a National Stage Application of PCT/SE2021/050665, filed 2 Jul. 2021, which claims benefit of Serial No. 2050886-7, filed 13 Jul. 2020 in Sweden, and which applications are hereby incorporated by reference in their entireties. To the extent appropriate, a claim of priority is made to each of the above disclosed applications.

FIELD OF THE INVENTION

The present invention relates to a method and a system for brazing a plate heat exchanger. Plate heat exchangers comprise a plurality of heat exchanger plates having a pattern of elevations and depressions, such as ridges and grooves, providing contact points between crossing elevations and depressions of neighbouring plates under formation of interplate flow channels for fluids to exchange heat when the plates are stacked. Port openings are provided to allow selective fluid flow in and out from the interplate flow channels. Such plate heat exchangers are brazed in a furnace having a heating chamber. A plurality of nozzles is arranged inside the heating chamber to provide a heating gas into the chamber and thereby allow brazing of the plate heat exchanger. After brazing, a cooling gas can be conducted into the heating chamber through the nozzles.

PRIOR ART

Heat exchangers are used for exchanging heat between fluid media. They generally comprise a start plate, an end plate and a number of heat exchanger plates stacked onto one another in a manner forming flow channels between the heat exchanger plates. Usually, port openings are provided to allow selective fluid flow in and out from the flow channels.

A common way of manufacturing a plate heat exchanger is to braze the heat exchanger plates together to form the plate heat exchanger. Brazing a heat exchanger means that a number of heat exchanger plates are provided with a brazing material, after which the heat exchanger plates are stacked onto one another and placed in a furnace, wherein the furnace is heated to a temperature sufficiently high to at least partially melt the brazing material. After the temperature of the furnace has been lowered, the brazing material will solidify, whereupon the heat exchanger plates will be joined to one another to form a brazed plate heat exchanger.

One problem with such brazing methods and systems according to the prior art is that they are time-consuming. Heat is transferred from or to the furnace to or from the peripheral surfaces of the stack of plates by means of radiation and or convection. However, the heat transport inside the stack of plates is controlled by heat condition. Heat conduction through the individual plates is a slow and time consuming process.

Another problem with such prior art brazing is that it can require considerable amounts of energy for heating. A reduced brazing cycle time will reduce energy consumption.

SUMMARY OF THE INVENTION

One object of the present invention is to overcome or at least alleviate the above-mentioned problems and provide an efficient method and system for brazing plate heat exchangers.

The present invention is related to a method for brazing a plate heat exchanger having a stack of heat exchanger plates with depressions and elevations forming interplate flow channels and port openings being in selective fluid communication with said interplate flow channels, the method comprising the steps of
a) placing the stack of heat exchanger plates in a heating chamber of a furnace,
b) conducting a gas for changing the temperature of the stack of heat exchanger plates through a plurality of nozzles inside the heating chamber, and
c) conducting gas from at least one of said nozzles into at least one of the port openings of the stack of heat exchanger plates and thereby create a flow of gas through the interplate flow channels of the plate heat exchanger.

By conducting gas from the nozzle into the stack of heat exchanger plates through at least one of the port openings efficient distribution of gas inside the stack of heat exchanger plates is achieved to provide for rapid, more uniform and energy efficient heating and/or cooling during a brazing process. Consequently, a heating gas or a cooling gas can be forced to flow into the interplate flow channels of the heat exchanger, wherein the heating gas or cooling gas is efficiently distributed inside the heat exchanger for rapid heating or cooling thereof. This is particularly useful for bigger heat exchangers. In addition to shorter cycle times for brazing also the product properties can be improved by the present invention due to faster heating and/or cooling of the heat exchanger. For example, the rapid cooling can result in quenching. It has been found that the mechanical and corrosion properties of the base material (the material of the heat exchanger plates) are improved when time at elevated temperatures is reduced and the cooling speed is increased. Hence, the material properties of the brazed heat exchanger will improve when the brazing time is reduced. Prolonged time at elevated temperatures may cause excessive grain growth and loss in mechanical strength. Low cooling speeds can introduce undesirable structures in the base material, such as Chromium carbides, which impairs the corrosion properties.

The method can include the step of conducting gas from a nozzle into a port opening of the stack of heat exchanger plates by means of a tube and/or by aligning the port opening with the nozzle.

The method can include the steps of conducting gas from a first nozzle into a first port opening of the stack of heat exchanger plates by means of a first tube and/or by aligning the first port opening with the first nozzle, and conducting gas from a second nozzle into another port opening of the stack of heat exchanger plates by means of a second tube and/or by aligning said other port opening with the second nozzle. Hence, the gas can be conducted in an efficient manner, such as in a counter-current flow through the stack of heat exchanger plates.

The method can include the steps of placing the stack of heat exchanger plates on a support with holes, aligning port openings of the stack of heat exchanger plates with holes in the support, and conducting the gas from a nozzle into at least the first port opening of the stack of heat exchanger plates through one of said holes. Hence, an efficient way of directing the flow of gas from one or more nozzles into one or more port openings, such as by aligning the one or more holes with the nozzles and/or by using one or more tubes to direct the gas into the one or more port openings, is achieved.

The present invention is also related to a system for brazing a plate heat exchanger having a stack of heat exchanger plates with depressions and elevations forming interplate flow channels and port openings being in selective fluid communication with said interplate flow channels, wherein the system comprises a furnace with a heating chamber and a plurality of nozzles to provide a gas for changing the temperature of a stack of heat exchanger plates arranged inside the chamber, characterised in that the system is arranged so that gas from at least one of said nozzles is conducted into one of said port openings of the stack of heat exchanger plates.

The system can comprise a support for the stack of heat exchanger plates, wherein the support is provided with a plurality of holes, at least one of said holes being configured to be at least partially aligned with a port opening of the stack of heat exchanger plates. Hence, an efficient system for heating and/or cooling is achieved. The holes in the support allow for gas to be introduced into a port opening or a plurality of port openings aligned with holes and also allows for efficient circulation of gas around the heat exchanger for efficient heating or cooling. Selected holes can be aligned with nozzles and/or arranged to cooperate with selected nozzles through tubes. For example, selected port openings can be connected to a nozzle by means of a tube or tubes, e.g. so that gas is forced directly into said port openings.

Hence, an efficient system for brazing plate heat exchangers is achieved. By means of the system the flow of gas is directed from the nozzle into the stack of heat exchanger plates through at least one of the port openings, wherein the interplate flow channels of the stack of heat exchanger plates is used in an efficient way to distribute the gas inside the stack for rapid and energy efficient heating during a brazing process and/or rapid cooling of the stack of heat exchanger plates after heating.

The nozzles can be connected to a source of heating gas and/or a source of cooling gas, wherein the system can be arranged for efficient heating of the heat exchanger for brazing and then efficient cooling after the brazing. Also, the nozzles can be selectively openable for optimizing heating and/or cooling by conducting the gas both through the heat exchanger and onto the outer surface of the heat exchanger and also for heating and/or cooling of different types, numbers or positions of heat exchangers inside the heating chamber.

Further characteristics and advantages of the present invention will become apparent from the description of the embodiments below, the appended drawings and the dependent claims.

BRIEF DESCRIPTION OF THE DRAWINGS

In the following, the invention will be described with reference to appended drawings, wherein.

DESCRIPTION OF EMBODIMENTS

Figure 1:
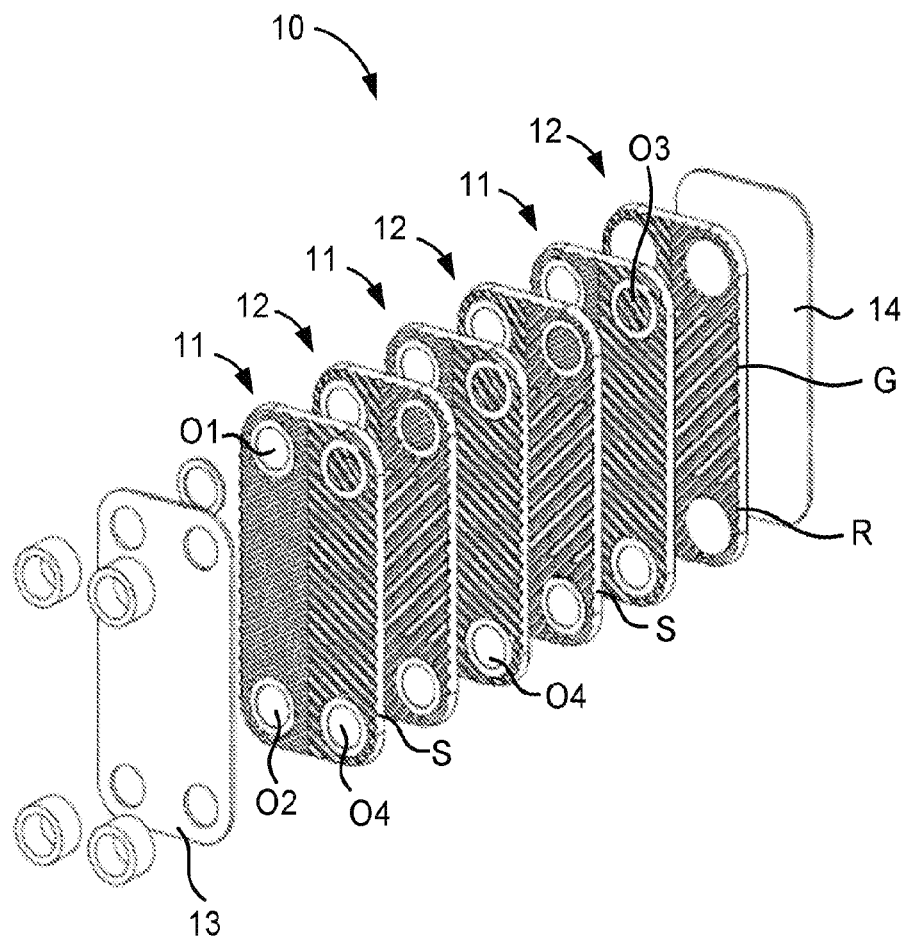
FIG. 1 is an exploded and schematic perspective view of a plate heat exchanger according to one general example.

With reference to FIG. 1 a brazed plate heat exchanger 100 is illustrated according to one general example. The plate heat exchanger 10 comprises a plurality of first heat exchanger plates 11 and a plurality of second heat exchanger plates 12 stacked in a stack to form the plate heat exchanger 10. The first and second heat exchanger plates 11, 12 are arranged alternatingly, wherein every other plate is a first heat exchanger plate 11 and every other plate is a second heat exchanger plate 12. Alternatively, the first and second heat exchanger plates are arranged in another configuration together with additional heat exchanger plates. For example, the first and second heat exchanger plates are identical. Alternatively, the first and second heat exchanger plates 11, 12 are not identical.

The heat exchanger plates 110, 120 are made from sheet metal and are provided with a pressed pattern of elevations and depressions, such as ridges R and grooves G, such that interplate flow channels for fluids to exchange heat are formed between the plates 11, 12 when the plates are stacked in a stack to form the plate heat exchanger 10 by providing contact points between at least some crossing elevations and depressions of neighbouring plates 11, 12 under formation of the interplate flow channels for fluids to exchange heat. The pressed pattern of FIG. 1 is a herringbone pattern. Alternatively, the pressed pattern is in the form of obliquely extending straight lines or of other suitable pattern.

In the illustrated embodiment, each of the heat exchanger plates 11, 12 is surrounded by a skirt S, which extends generally perpendicular to a plane of the heat exchanger plate and is adapted to contact skirts of neighbouring plates in order to provide a seal along the circumference of the heat exchanger.

The heat exchanger plates 11, 12 are arranged with port openings O1-O4 for letting fluids to exchange heat into and out of the interplate flow channels. In the illustrated embodiment, the heat exchanger plates 11, 12 are arranged with a first port opening O1, a second port opening O2, a third port opening O3 and a fourth port opening O4. Each of the port openings O1-O4 are arranged as a hole through the heat exchanger plate, wherein the port openings extend in a direction perpendicular to a plane of the plate. Areas surrounding the port openings O1 to O4 are provided at different levels such that selective communication between the port openings and the interplate flow channels is achieved, such as in a conventional manner. In the plate heat exchanger 10, the areas surrounding the port openings O1-O4 are arranged such that the first and second port openings O1 and O2 are in fluid communication with one another through some interplate flow channels, whereas the third and fourth port openings O3 and O4 are in fluid communication with one another by neighboring interplate flow channels. Alternatively, the first port openings O1 are in fluid communication with the fourth port openings O4, wherein the second port openings O2 are in fluid communication with the third port openings O3. In the illustrated embodiment, the heat exchanger plates 11, 12 are rectangular with rounded corners, wherein the port openings O1-O4 are arranged near the corners. Alternatively, the heat exchanger plates 11, 12 are square, e.g. with rounded corners. Alternatively, the heat exchanger plates 11, 12 are circular, oval or arranged with other suitable shape, wherein the port openings O1-O4 are distributed in a suitable manner. In the illustrated embodiment, each of the heat exchanger plates 11, 12 is formed with four port openings O1-O4. Please note that in other embodiments of the invention, the number of port openings may be larger than four, e.g. six, eight or ten. For example, the number of port openings is at least six, wherein the heat exchanger is configured for providing heat exchange between at least three fluids. Hence, according to one embodiment, the heat exchanger is a three circuit heat exchanger having at least six port openings and in addition being arranged with or without at least one integrated suction gas heat exchanger.

In the illustrated embodiment, the plate heat exchanger 10 also comprises a start plate 13 and an end plate 14. The start plate 13 is formed with openings corresponding to the port openings O1-O4 for letting fluids into and out of the interplate flow channels formed by the first and second heat exchanger plates 11, 12. For example, the end plate 14 is a conventional end plate. Preferably, the heat exchanger plates are made from austenitic stainless steel having a thickness of 0.1 to 2 mm.

Figure 2:
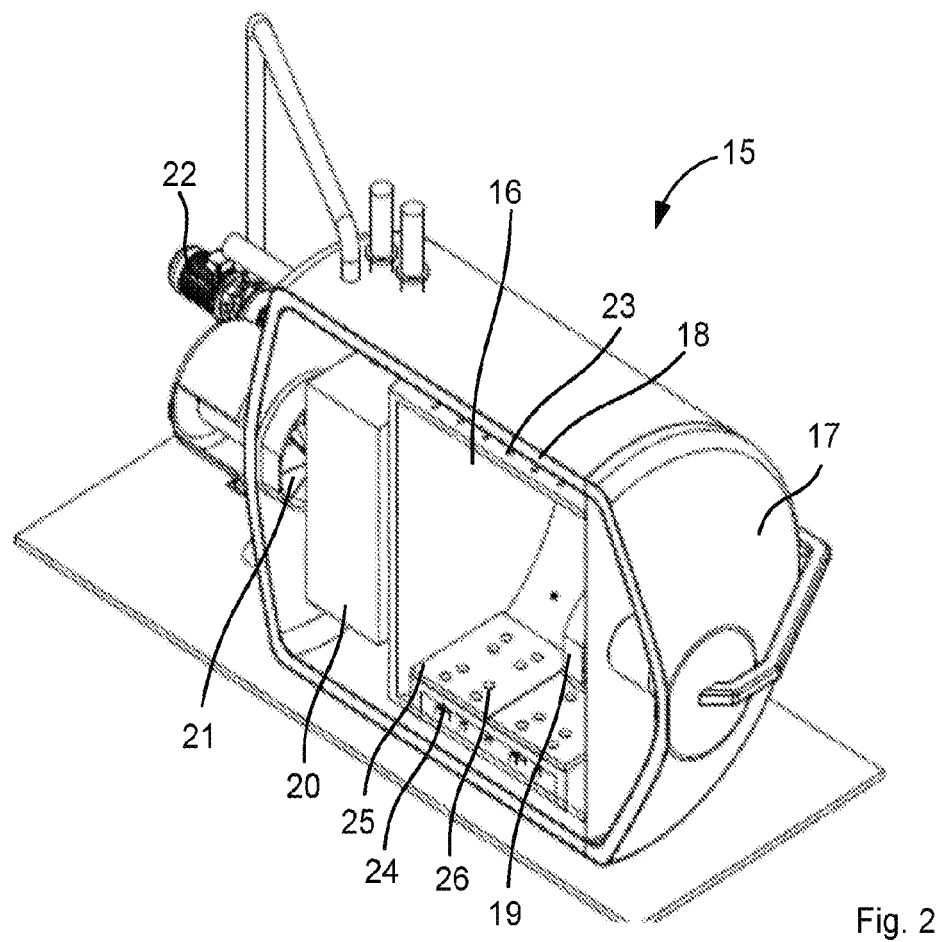
FIG. 2 is a schematic perspective view of a section of a system for brazing a plate heat exchanger according to one embodiment of the present invention, illustrating a furnace and a support for a plate heat exchanger arranged inside the furnace.
Figure 3:
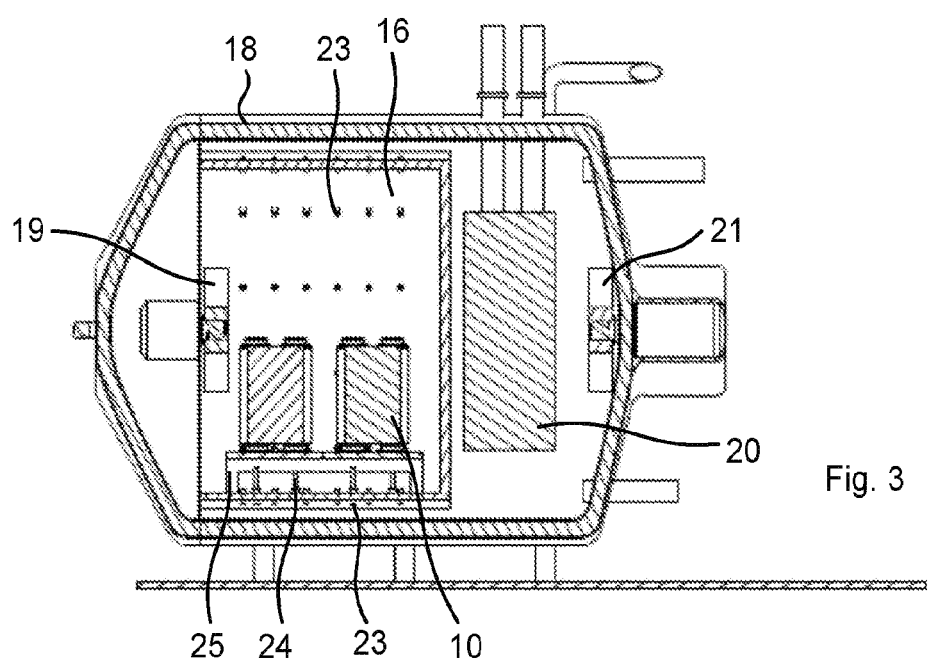
FIG. 3 is a schematic section view of the furnace of FIG. 2, illustrating plate heat exchangers arranged on the support inside the heating chamber.

With reference to FIGS. 2 and 3 a system for brazing a plate heat exchanger according to one embodiment of the present invention is illustrated schematically. The system is arranged for brazing a plate heat exchanger 10 having a stack of heat exchanger plates with depressions and elevations forming interplate flow channels and port openings being in selective fluid communication with said interplate flow channels. For example, the system is adapted for brazing a plate heat exchanger 10 of the type as described with reference to FIG. 1. For example, the system is arranged for brazing a plate heat exchanger 10 having at least two port openings or at least four port openings O1-O4. In the illustrated embodiments the plate heat exchanger 10 has four port openings O1-O4. It is understood that each heat exchanger plate has port openings and that these form port openings of the heat exchanger. For example, the port openings of each heat exchanger plate form port openings in the form of inlet and outlet channels of the heat exchanger in a conventional manner. It is also understood that the plate heat exchanger 10 is formed after brazing but in this disclosure a stack of heat exchanger plates, optionally with end plates, and provided with brazing material may be referred to as the plate heat exchanger 10 also during brazing and before brazing.

The system comprises a furnace 15 for heating the brazing material in the stack of heat exchanger plates to form the brazed plate heat exchanger 10. The furnace 15 comprises a heating chamber 16 for housing the plate heat exchanger 10, wherein the stack of heat exchanger plates is placed in the heating chamber 16 for brazing. In the illustrated embodiment, the furnace 15 is closed by means of a door 17, such as a substantially vertical door, wherein the plate heat exchanger 10 can be placed in and collected from the heating chamber 16 in a horizontal direction. For example, the heating chamber 16 is cylindrical. Alternatively, the heating chamber is formed with a rectangular cross section. For example, the heating chamber 16 comprises a steel structure covered with graphite plates. Alternatively, the heating chamber 16 is formed in molybdenum.

In the illustrated embodiment, the furnace 15 comprises a pressure vessel 18, wherein the heating chamber 16 is arranged inside the pressure vessel 18. For example, the furnace 15 is a vacuum furnace with convection heating and optional quenching at elevated pressure. For example, the pressure vessel 18 is arranged for pressures from 0, or close to 0, and up to at least 5 bar (500 kPa). Alternatively, the furnace 15 is an atmospheric furnace. In the illustrated embodiment, a convection fan 19 for heating is arranged inside the heating chamber 16. Heating elements (not shown) are, e.g. arranged inside the heating chamber 16. Illustrated in FIGS. 2 and 3 are also a furnace heat exchanger 20 for gas cooling and a fan 21 arranged inside the pressure vessel 18 and outside the heating chamber 16. For example, the furnace heat exchanger 20 is for cooling gas and the fan 21 is a cooling fan for quenching. In FIG. 2 a pump 22 is illustrated for providing vacuum in the heating chamber 16. For example, vacuum and elevated pressures in the pressure vessel 18 are provided by conventional means to provide vacuum and elevated pressures above pressure, including for example elevated pressures up to 150 kPa, 300 kPa, 500 kPa or more. For example, elevated pressures in the pressure vessel 18 are provided by means of gas tanks and buffer tanks.

A plurality of nozzles 23 is arranged inside the heating chamber 16 to allow gas into and out of the heating chamber 16. The nozzles 23 are connected to a source of gas and are arranged to provide a gas flow to the heating chamber 16 and/or the heat exchanger therein, e.g. by means of the convection fan 19 or fan 21 inside the furnace or by external blowers (not illustrated). The gas is a heating gas or a cooling gas. According to one embodiment, the gas is a pre-heated heating gas for heating the brazing material in the stack of heat exchanger plates to braze the plate heat exchanger 10. For example, the gas is an inert gas, such as a conventional heating or cooling gas. For example, the gas is nitrogen, argon or helium gas.

In the illustrated embodiment, nozzles 23 are distributed around the plate heat exchanger 10 to provide the gas from different directions towards the plate heat exchanger 10. For example, the heating chamber 16 has a substantially circular or oval cross section, wherein the nozzles 23 are arranged around the heating chamber 16 and directing gas substantially towards a centre or centre line of the heating chamber 16 where the plate heat exchanger 10 is positioned. For example, at least one of the nozzles 23 is connected to a tube 24 for guiding or conducting the gas to the plate heat exchanger 10. For example, the tube 24 is a graphite tube or a tube made of another suitable material, such as CFC or ceramic.

In the illustrated embodiment, the system comprises a support 25 having a plurality of holes 26. The support 25 is arranged for supporting one or more plate heat exchangers 10. The support 25 is for example formed as a platform with the holes 26 extending through the platform perpendicular to a plane thereof.

Figure 4:
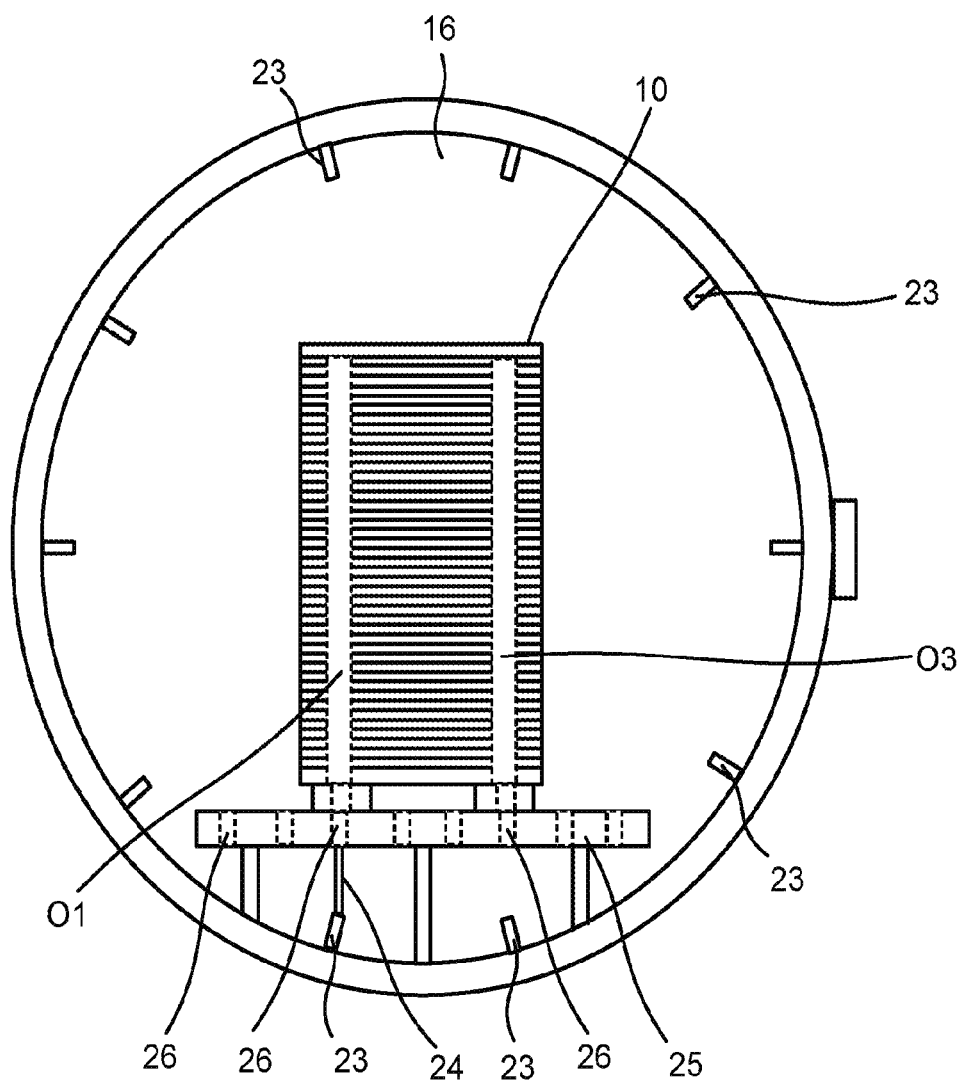
FIG. 4 is a schematic front view of a part of the system for brazing a plate heat exchanger according to one embodiment of the present invention, illustrating the heating chamber, the support and a plate heat exchanger arranged on said support inside the heating chamber.

FIG. 4 is a schematic illustration of the heating chamber 16 and a plate heat exchanger 10 arranged on the support 25. As illustrated in FIG. 4 at least one of the nozzles 23 is connected to a tube 24 for conducting the gas into one of the port openings O1 of the plate heat exchanger 10. Alternatively, at least one port opening is aligned with a nozzle 23. Hence, the gas flow is directed into the port opening O1 for rapid heating or cooling of the plate heat exchanger 10, which is described more in detail below.

Port openings O1-O4 of the stack of heat exchanger plates are aligned with the holes 26 of the support 25. For example, at least two or at least four of the port openings O1-O4 are aligned with holes 26 in the support 25. For example, all port openings of the plate heat exchanger 10 are aligned with holes 26 in the support 25. In FIG. 4, the first port opening O1 is aligned with a first hole 26, wherein the neighboring third port opening O3 is aligned with another hole 26 in the support 25. For example, also a third port opening O3 and a fourth port opening O4 are aligned with holes 26 in the support (which are not seen in FIG. 4). A first nozzle 23 is connected to a first tube 24 for conducting the gas into the first port opening O1 of the stack of heat exchanger plates. Hence, the gas is conducted from the first nozzle 23 to the first port opening O1 through the first tube 24 and the first hole 26 in the support 25. For example, the first tube 24 is directed towards the first hole 26. Alternatively, the first tube 24 is arranged extending into or through the first hole 26. For example, the first tube 24 is extending into the first port opening O1. Alternatively, the first tube 24 is connected to first port opening O1 or the first hole 26 and aligned with the first nozzle 23. Hence, the gas is conducted from the first nozzle 23 and into the first port opening O1 through the first tube 24 and the first hole 26. Optionally, another nozzle 23, such as a second nozzle 23, is connected to another tube 24, such as a second tube 24, for conducting the gas into another port opening of the stack of heat exchanger plates, such as the second port opening O2 or third port opening O3. Alternatively, one or more of the holes 26 aligned with port openings are aligned with nozzles 23.

Figure 5:
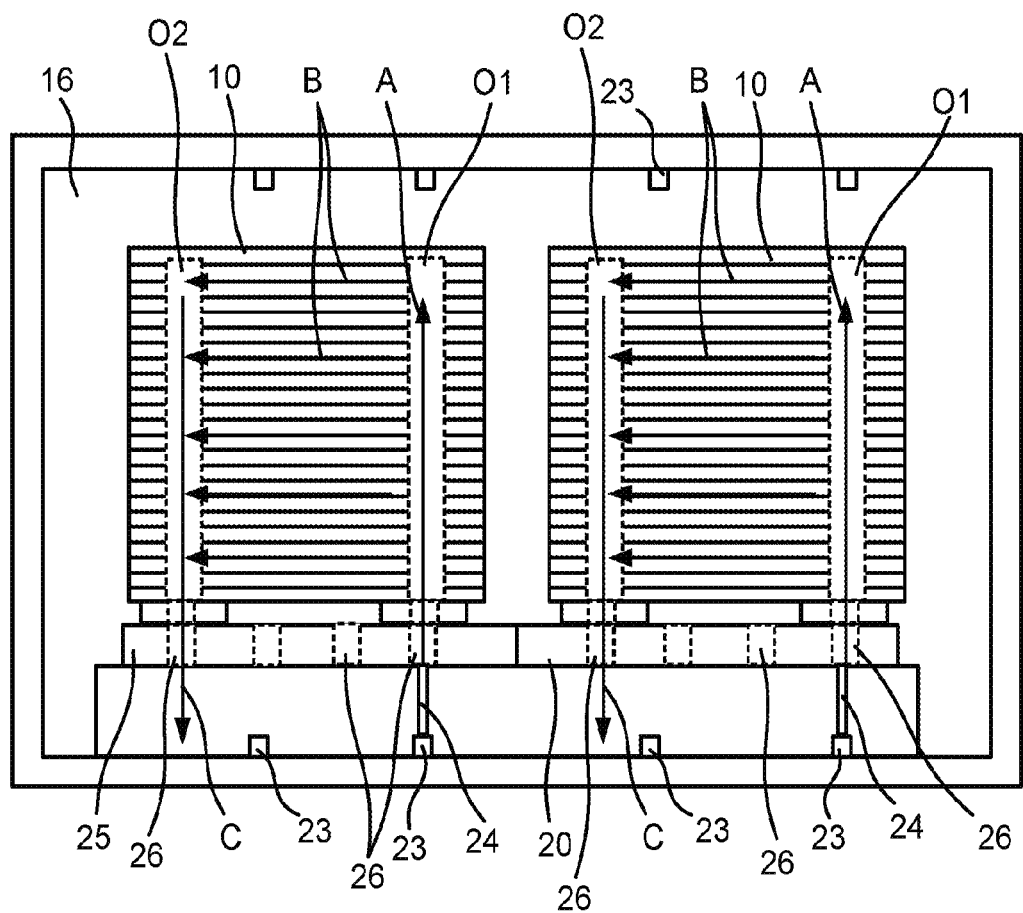
FIG. 5 is a schematic side view of a part of the system for brazing a plate heat exchanger according to another embodiment, illustrating two plate heat exchangers on supports inside the heating chamber.

With reference also to FIG. 5 the heating chamber 16 is illustrated schematically with two plate heat exchangers 10 arranged on supports 25 inside the heating chamber 16. For example, a first plate heat exchanger 10 is arranged on a first support 25, wherein a second plate heat exchanger 10 is arranged on a second support 25. In FIG. 5 the plate heat exchangers 10 and supports 25 are similar and therefore denoted with the same reference numbers. In FIG. 5 the gas from at least one nozzle 23 is guided to one of the port openings O1 of a plate heat exchanger 10 by means of the tube 24 as described above, wherein the flow of gas through the plate heat exchanger 10 is illustrated schematically according to one embodiment by means of arrows. According to one embodiment the gas is a heating gas, wherein the heating gas is conducted into the first port opening O1 via the tube 24 and the hole 26 in the support 25, so that a flow of heating gas is forced into the first port opening O1 as illustrated by means of the arrow A. For example, the tube 24 is connected to the nozzle 23, wherein the tube 24 connected to the first port opening O1 or the hole 26 in the support 25. Alternatively, the tube 24 is connected to the first port opening O1, arranged through the hole 26 and then connected to the suitable nozzle 23. The flow of heating gas is conducted through the interplate flow channels communicating with the first port opening O1, which is illustrated by means of the arrows B in FIG. 5. For example, the heating gas is conducted through every other interplate flow channel or in another interplate flow channel pattern depending on the heat exchanger configuration. Then, the heating gas is conducted to another port opening communicating with the same interplate flow channels as the first port opening O1, such as the second port opening O2 in the example of FIG. 5 but may also be another port opening such as the fourth port opening O4, wherein the heating gas is forced out from the plate heat exchanger 10 and further through a hole 26 in the support 25, which is illustrated by the arrow C in FIG. 5. For example, the port opening for outgoing heating gas is aligned with a hole 26 in the support 25 and is substantially unobstructed. For example, the port opening for outgoing heating gas and the hole 26 aligned with said port opening are not connected to a nozzle 23. Hence, the heating gas is introduced into the plate heat exchanger 10 through one port opening, led through the interplate flow channels of the heat exchanger to rapidly heat and thereby braze the plate heat exchanger 10, wherein the heating gas is conducted out from the heat exchanger through another port opening and out through a hole 26 in the support 25. For example, the outgoing heating gas is collected in the heating chamber 16 or collected in an outlet, e.g. leading back to a heater for heating the gas again and returning it to the nozzles 23 for further heating. Optionally, other nozzles 23 are opened for conducting heating gas into the chamber 16 for heating of the plate heat exchanger 10 from the outside, e.g. in a conventional manner, in addition to blowing heating gas into one or more of the port openings of the heat exchanger.

According to one embodiment, another port opening is connected to a nozzle 23 in a similar manner for introducing heating gas into other interplate flow channels of the plate heat exchanger 10. For example, the heating gas is introduced into the heat exchanger in a counter-current flow. For example, the heating gas is introduced into the first port opening O1 and the fourth port opening O4, the fourth port opening O4 being arranged diagonally opposite the first port opening O1 or in any other conventional counter-current or co-current flow.

After brazing according to the heating process as set out above, or after brazing according to a conventional brazing process, a cooling gas is conducted to the nozzle 23 and optionally a plurality of nozzles 23. The cooling gas is conducted from a nozzle 23 and introduced into a port opening, such as the first port opening O1, through a tube 24 and a hole 26 in the support 25 in a similar manner as described above and as illustrated by means of the arrow A in FIG. 5. The cooling gas is then forced through the interplate flow channels communicating with the first port opening O1 and second port opening O2 as illustrated by means of the arrows B and out through the second port opening O2 as illustrated by means of the arrow C. For example, cooling is performed in a corresponding manner as heating, wherein the interplate flow channels are used for rapidly heating and/or cooling of the heat exchanger during the brazing process.

According to one embodiment, cooling gas is introduced into the pressure vessel 18 after heating of the plate heat exchanger 10. The cooling gas is forced from the pressure vessel 18 and into the heating chamber 16 through the nozzles 23 and into at least one port opening O1 of the plate heat exchanger 10 for rapid cooling thereof. For example, cooling gas is introduced to provide elevated pressure inside the pressure chamber and hence provide a flow of cooling gas into the nozzles 23.

According to one embodiment example a plate heat exchanger 10 is positioned inside the heating chamber 16 with port openings O1-O4 aligned with holes 26 in the support 25. The door 17 is closed and air is removed from the furnace 15, such as by means of the pump 22 to lower the pressure inside the pressure vessel 18 and the heating chamber 16 below atmospheric pressure, such as to 0.5 mbar (50 Pa). Gas is conducted into the furnace 15 and the heating chamber 16 is heated, e.g. by heating elements in a conventional manner. The convection fan 19 is started and circulates the gas (e.g. at 1500 mbar) around the plate heat exchanger 10. According to one embodiment the convection fan 19 is turned off at an elevated temperature, typically below 750° C., wherein the gas is pumped out from the heating chamber 16. Then, heating is continued under vacuum (e.g. about 0.02 mbar). For example, the heating continues to 1050° C., wherein the pressure is increased, such as to 1-2 mbar. Then, the heating in the heating chamber 16 is continued to the recommended brazing temperature for the brazing filler, typically 50° C. over the melting point of the filler metal, until the joining of the plate heat exchanger is completed. For example, the pressure is then kept at 1-2 mbar. Then, the cooling under vacuum is initiated.

According to one embodiment example of the present invention the gas is cooled and forced into the plate heat exchanger 10 through at least one port opening O1 thereof under elevated pressure. For example, the gas is cooled and circulated inside the pressure vessel 18 and the heating chamber 16 by means of the fan 21 and the heat exchanger 20, wherein the gas is forced into the nozzles 23 and into the port opening of the plate heat exchanger 10, optionally through the tube 24, for cooling the plate heat exchanger 10 from the inside thereof. Optionally, the gas is also forced into the heating chamber 16 through nozzles 23 for cooling the plate heat exchanger 10 from the outside. According to one embodiment, the cooling is initiated at a low pressure and is increased along with the cooling of the plate heat exchanger 10. For example, cooling is increased from 1-2 bar, such as about 1,5 bar, and up to 3-5 bar, such as 5 bar throughout the cooling process. Hence, cooling gas is forced into nozzles 23 aligned with holes 26 of the support 25 and port openings of the plate heat exchanger or connected to said holes 26 through the tube 24, wherein cooling gas under elevated pressure is forced through the holes 26 and into selected port openings.

Figure 6:
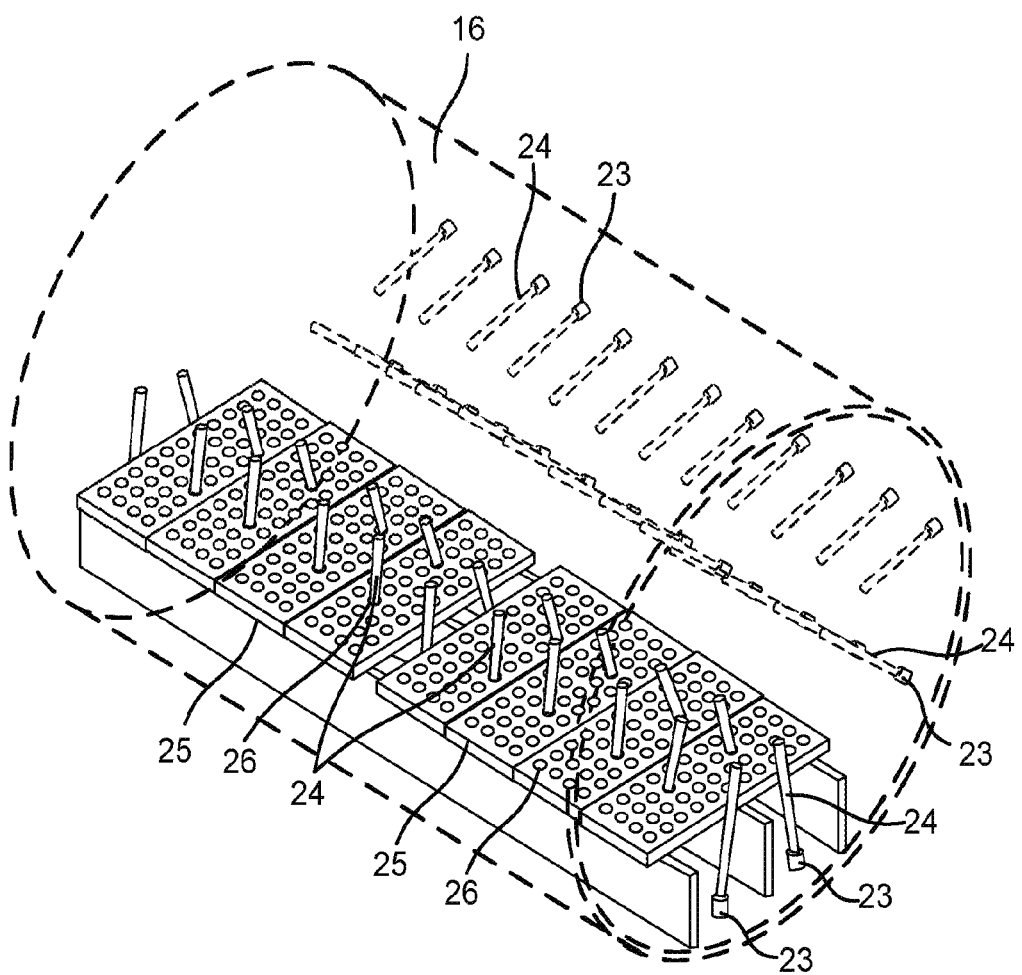
FIG. 6 is a schematic perspective view according to yet another embodiment of a part of the system, illustrating the heating chamber partially with dashed lines, and supports inside the heating chamber, wherein tubes are mounted on nozzles of the heating chamber.
Figure 7:
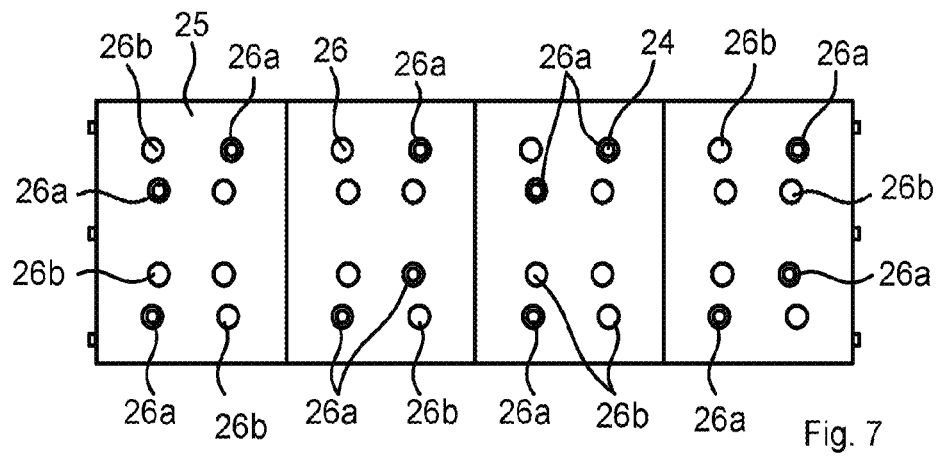
FIGS. 7 and 8 are schematic top views of the support according to one embodiment, illustrating a configuration of holes in said support.
Figure 8:
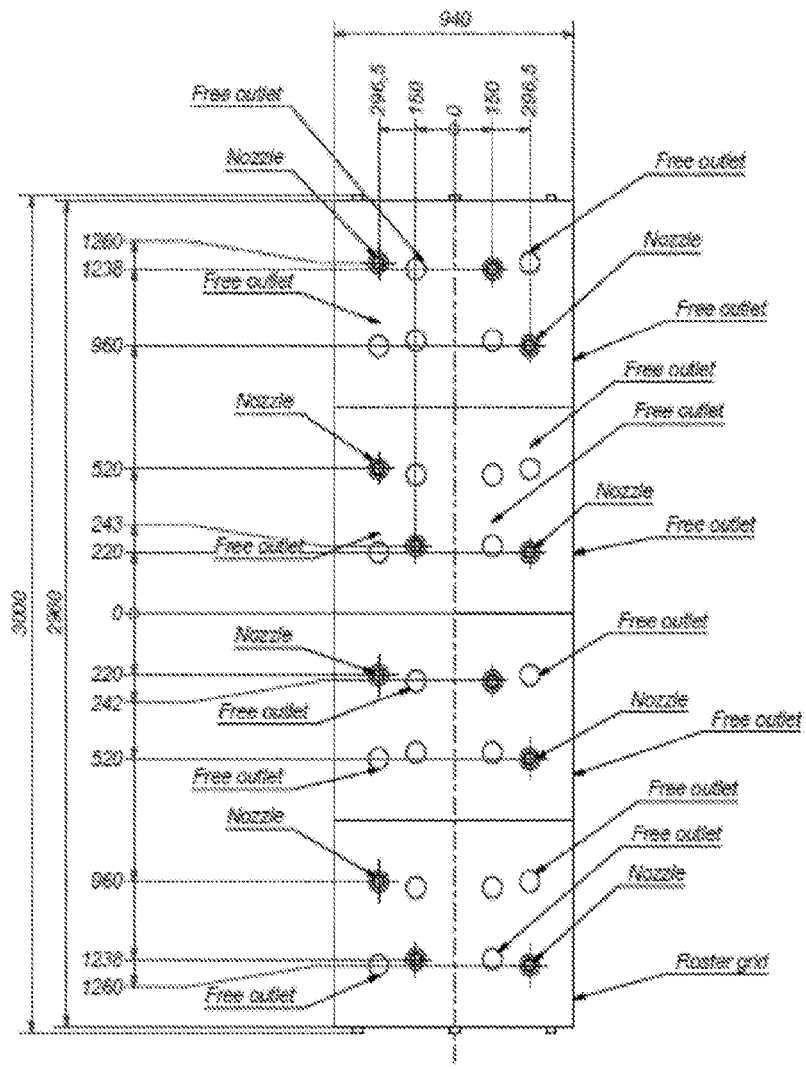
Figure 9:
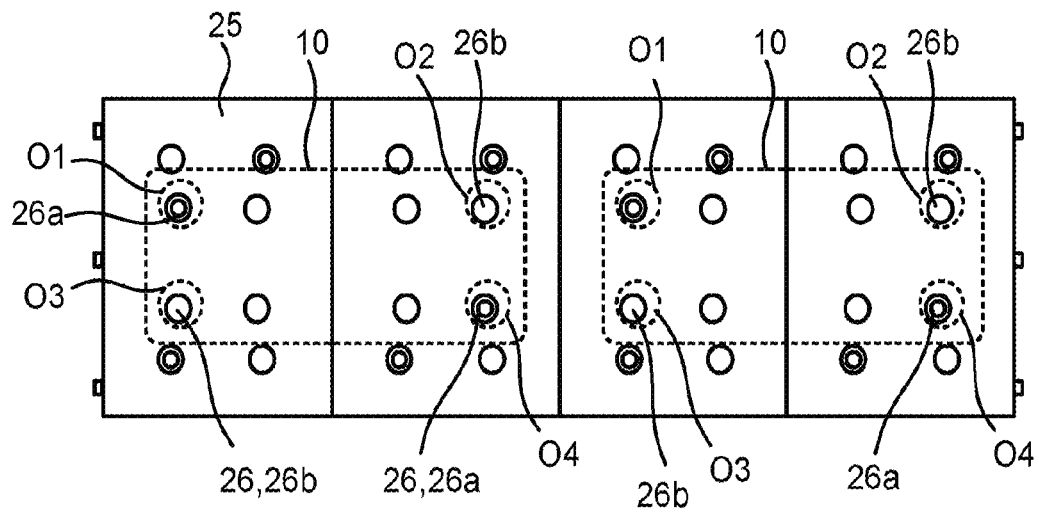
FIGS. 9 and 10 are schematic top views of the support of FIG. 7 with different plate heat exchangers illustrated with dashed lines.
Figure 10:
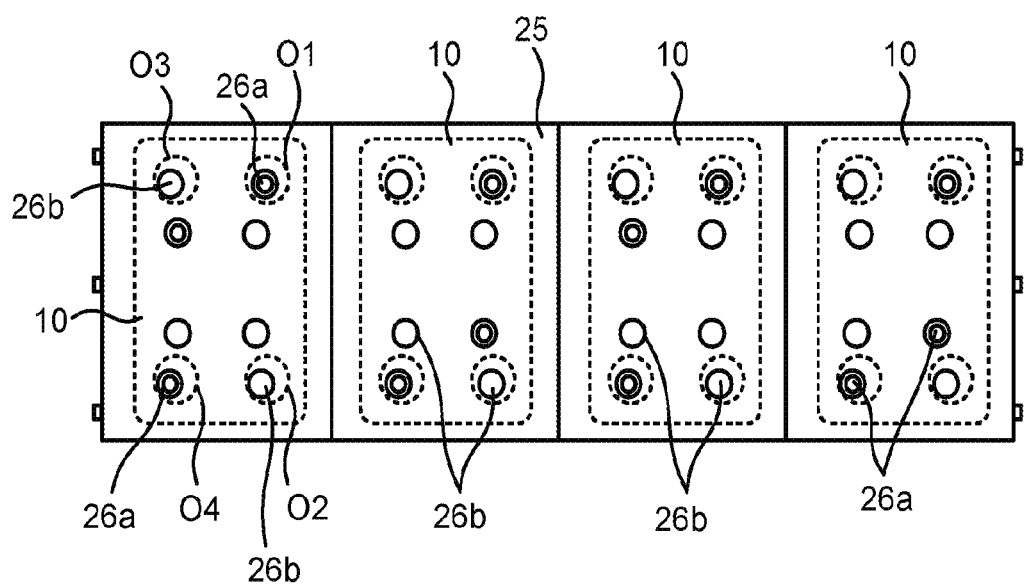

With reference to FIG. 6 a plurality of supports 25 arranged inside the heating chamber 16 of the furnace 15 is illustrated schematically according to one embodiment wherein the heating chamber 16 and some of the nozzles 23 and tubes 24 are illustrated with dashed lines. In the embodiment of FIG. 6, a plurality of nozzles 23 and tubes 24 are distributed inside the heating chamber 16. For example, nozzles 23 are arranged in rows along the heating chamber 16, which rows are distributed around the surface of the heating chamber 16. As can be understood not all nozzles 23 are illustrated in FIG. 6 so as not to obstruct the view of the supports 25 with the holes 26. In the embodiment of FIG. 6 the supports 25 are perforated and thus comprises a plurality of holes 26 distributed in a plane of the support 25. The tubes 24 are connected to the nozzles 23 and in FIG. 6 tubes 24 are arranged through holes 26 in the supports 25 to extend into or being connected to port openings of heat exchangers placed thereon.

With reference to FIGS. 7-10 a support 25 is illustrated according to some embodiments, wherein the support 25 is provided with the holes 26 in the form of nozzle connection inlets 26a and free outlets 26b. For example, the nozzle connection inlets 26a are connected to the tube 24. In the drawings the nozzle connection inlets 26a are illustrated by means of a double circle, which e.g. illustrates the nozzle connection inlet 26a with the tube 24, and the free outlets 26b are illustrated by means of a single circle. In the illustrated embodiment, the holes 26 are arranged in sets to be aligned with the port openings of different heat exchangers as illustrated schematically in FIGS. 9 and 10, wherein different plate heat exchangers 10 are illustrated by means of dashed lines. The holes 26 are arranged in rows, such as at least two or at least four rows, wherein selected holes are intended to be nozzle connection inlets 26a and selected holes are intended to be free outlets 26b. For example, the holes 26 are positioned to fit different types of plate heat exchangers 10, e.g. different types of plate heat exchangers having at least four port openings to be aligned with holes 26. For example, the holes 26 are positioned to fit different types of plate heat exchangers 10 in different configurations.

For example, the heat exchanger to be brazed is placed on the support 25 and then the support 25 with the plate heat exchanger 10 are placed inside the furnace 15, wherein tubes 24 are connected to the holes 26 or the selected port opening or port openings. Alternatively, the support 25 with the plate heat exchanger 10 is placed inside the furnace so that the holes 26 are aligned with the tubes 24. Alternatively, the tubes 24 are connected to the plate heat exchanger 10 or the support 25 and then, after positioning of the support 25 with the plate heat exchanger 10 inside the furnace 15, the tubes 24 are connected to the nozzles 23.

The invention claimed is:

1. A method for brazing a plate heat exchanger having a stack of heat exchanger plates with depressions and elevations forming interplate flow channels and port openings being in selective fluid communication with said interplate flow channels, the method comprising the steps of
   a) placing the stack of heat exchanger plates on a support with holes, aligning port opening of the stack of heat exchanger plates with holes in the support, and placing the stack of heat exchanger plates in a heating chamber of a furnace,
   b) conducting a gas for changing the temperature of the stack of heat exchanger plates through a plurality of nozzles inside the heating chamber, and
   c) conducting gas from at least one of said nozzles into at least a first port opening of the port openings of the stack of heat exchanger plates through one of said holes in the support and thereby create a flow of gas through the interplate flow channels of the plate heat exchanger.

2. The method according to claim 1, including the step of conducting gas from a nozzle into a port opening of the stack of heat exchanger plates by means of a tube and/or by aligning the port opening with the nozzle.

3. The method according to claim 2, including the steps of conducting gas from a first nozzle into a first port opening of the stack of heat exchanger plates by means of a first tube and/or by aligning the first port opening with the first nozzle, and conducting gas from a second nozzle into another port opening of the stack of heat exchanger plates by means of a second tube and/or by aligning said other port opening with the second nozzle.

4. The method according to claim 3, including the step of conducting the gas in a counter-current flow through the stack of heat exchanger plates.

5. The method according to claim 1, comprising the step of aligning at least four port openings of the stack of heat exchanger plates with holes in the support.

6. The method according to claim 1, comprising the step of, after heating of the stack of heat exchanger plates, conducting a cooling gas into at least one of the port openings for cooling the plate heat exchanger.

7. The method according to claim 6, comprising the step of conducting the cooling gas into the port opening under elevated pressure above atmospheric.

8. The method according to claim 7, comprising the step of increasing the pressure during the cooling process.

\* \* \* \* \*

UNITED STATES PATENT AND TRADEMARK OFFICE
CERTIFICATE OF CORRECTION

PATENT NO. : 12,330,227 B2  
APPLICATION NO. : 18/015851  
DATED : June 17, 2025  
INVENTOR(S) : Niclas Bornegård Page 1 of 1

It is certified that error appears in the above-identified patent and that said Letters Patent is hereby corrected as shown below:

In the Claims

Column 10, Line 31, In Claim 1, insert --the-- after the word aligning and insert an --s-- after opening Signed and Sealed this  
Twelfth Day of August, 2025

Coke Morgan Stewart  
*Acting Director of the United States Patent and Trademark Office*